United States Patent
Fischer et al.

(10) Patent No.: US 10,185,312 B2
(45) Date of Patent: Jan. 22, 2019

(54) INSITU TOOL HEALTH AND RECIPE QUALITY MONITORING ON A CDSEM

(71) Applicant: GLOBALFOUNDRIES Inc., Grand Cayman (KY)

(72) Inventors: Daniel Fischer, Dresden (DE); Yvonne Jänicke, Dresden (DE); Stephan Melzig, Dresden (DE); Alexander Ullrich, Dresden (DE); Martin Pilz, Dresden (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 68 days.

(21) Appl. No.: 15/420,749

(22) Filed: Jan. 31, 2017

(65) Prior Publication Data
US 2018/0217584 A1 Aug. 2, 2018

(51) Int. Cl.
*G05B 19/418* (2006.01)

(52) U.S. Cl.
CPC .............. *G05B 19/41875* (2013.01); *G05B 2219/32182* (2013.01); *G05B 2219/32201* (2013.01); *G05B 2219/45031* (2013.01)

(58) Field of Classification Search
None
See application file for complete search history.

(56) References Cited

U.S. PATENT DOCUMENTS

| 6,980,873 | B2 | 12/2005 | Shen |
| 7,065,422 | B1* | 6/2006 | Green .............. G05B 23/0221 700/108 |
| 7,337,019 | B2 | 2/2008 | Reiss et al. |
| 7,365,322 | B2 | 4/2008 | Miyamoto et al. |
| 2011/0147587 | A1* | 6/2011 | Yang ................... H01J 37/222 250/310 |

OTHER PUBLICATIONS

Shanmugasundram et al., "Integrated Metrology and Advanced Process Control in Semiconductor Manufacturing", Meeting Abstracts of the Electrochemical Society, All Divisions; 1:619, Electrochemical Society by ECS, 2002.
Yamaguchi, et al., "CD-SEM Technologies for 65-nm Process Node", Hitachi Review vol. 54 (2005), No. 1.
Applied Materials, "Applied E3 Fault Detection and Classification Module", product brochure, copyright 2013.

* cited by examiner

*Primary Examiner* — Carlos R Ortiz Rodriguez
(74) *Attorney, Agent, or Firm* — Thompson Hine LLP; Anthony Canale

(57) ABSTRACT

Systems, methods, and computer program products for monitoring the tool health of on a critical dimension scanning electron microscope (CDSEM) and recipe quality on a CDSEM. Run-time data from a critical dimension scanning electron microscope is received at a computer. The computer converts the run-time data to time-sequenced data, and analyzes the time-sequenced data to detect an operational abnormality associated with the CDSEM.

12 Claims, 2 Drawing Sheets

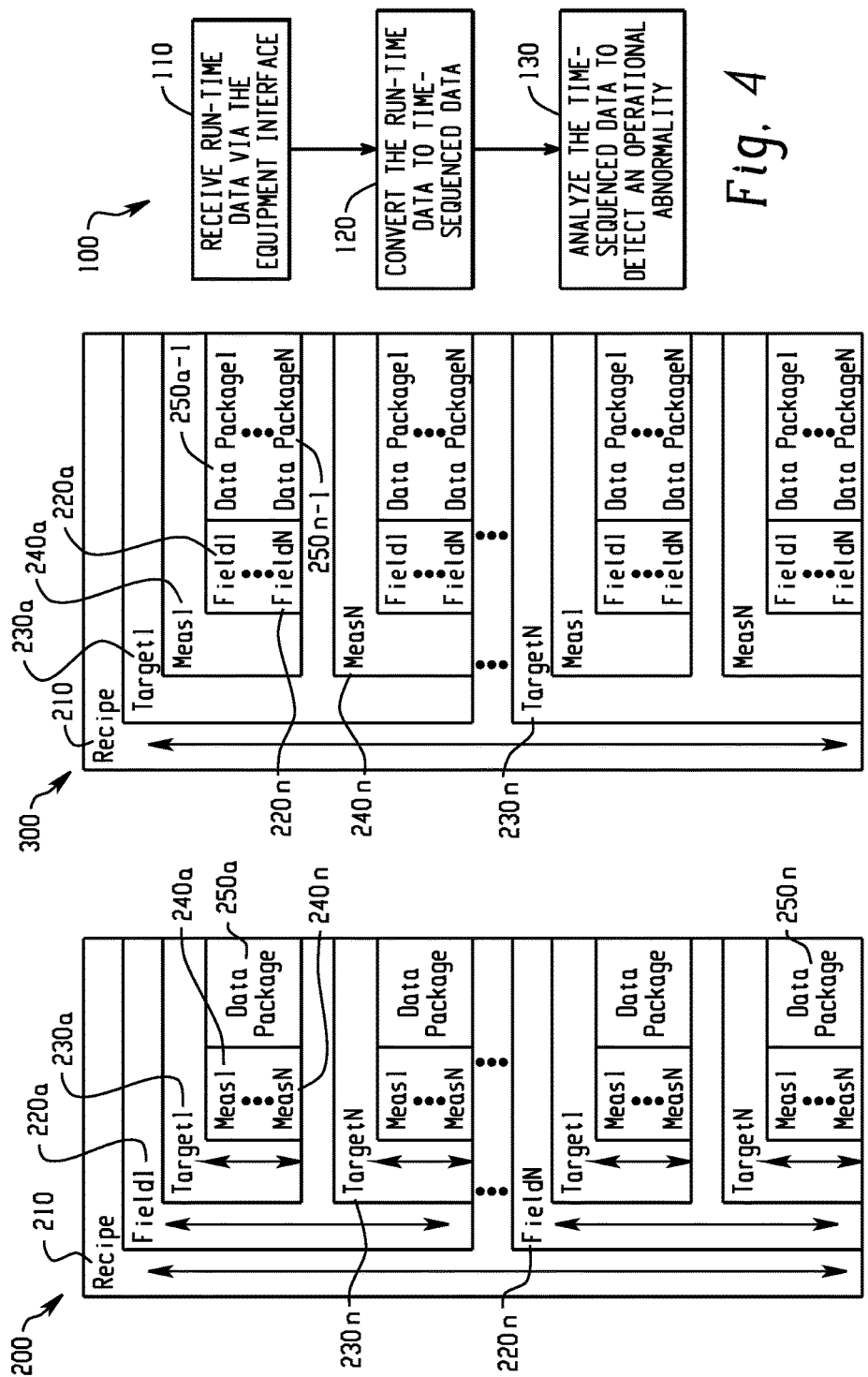

INSITU TOOL HEALTH AND RECIPE QUALITY MONITORING ON A CDSEM

BACKGROUND

The present invention relates generally to metrology and, in particular, to systems, methods, and computer program products for monitoring the tool health of on a critical dimension scanning electron microscope (CDSEM) and recipe quality on a CDSEM.

Integrated circuits are produced using a semiconductor wafer through a multiplicity of fabrication processes, and associated production tools, including thermal oxidation, diffusion, ion implantation, chemical vapor deposition, physical vapor deposition, epitaxial growth, etch, and photolithography. Advanced process control may rely on monitoring hardware and software at the production tool level to detect and classify faults. Fault detection and classification (FDC) provides the capability to establish a baseline of tool operation and, by comparing the current operation with the baseline, the capability to detect faults as well as classify or determine the root cause of a problem.

During fabrication stages, metrology tools are utilized to monitor the semiconductor wafers and control the production tools for quality and yield improvements. Automated surface inspection provides measurement data that is used to provide process control. A large amount of data is collected during the surface inspection process.

The stability of a CDSEM may be monitored based on repeating measurements made on a daily basis. Due to its infrequency, daily monitoring does not provide an awareness of problems that occur between monitoring runs. Instead, feedback about problems may originate from process modules, not the surface inspection process. In addition, potential measurement recipe issues at the CDSEM may not be detectable by daily monitoring.

Improved systems, methods, and computer program products for monitoring the tool health of a CDSEM and recipe quality on a CDSEM are needed.

SUMMARY

In an embodiment of the invention, a method includes receiving, at a computer, run-time data from a critical dimension scanning electron microscope, converting, by the computer, the run-time data to time-sequenced data, and analyzing, by the computer, the time-sequenced data to detect an operational abnormality associated with the critical dimension scanning electron microscope.

In an embodiment of the invention, a system includes one or more computer processors, and a memory storing instructions that upon execution by the one or more computer processors cause the system to receive run-time data from a critical dimension scanning electron microscope, convert the run-time data to time-sequenced data, and analyze the time-sequenced data to detect an operational abnormality associated with the critical dimension scanning electron microscope.

In an embodiment of the invention, a computer program product includes a non-transitory computer-readable medium, and instructions stored on the non-transitory computer-readable medium that upon execution by one or more computer processors cause the one or more computer processors to receive run-time data from a critical dimension scanning electron microscope, convert the run-time data to time-sequenced data, and analyze the time-sequenced data to detect an operational abnormality associated with the critical dimension scanning electron microscope.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

FIG. 2 is a diagrammatic view of a tool report generated by the CDSEM and communicated to the equipment interface.

FIG. 3 is a diagrammatic view of a transformed tool report generated by the equipment interface from the tool report received from the CDSEM and subsequently used in fault detection and classification analysis.

FIG. 4 is a flowchart detailing a method for monitoring tool health and recipe quality on a CDSEM.

DETAILED DESCRIPTION

Figure 1:
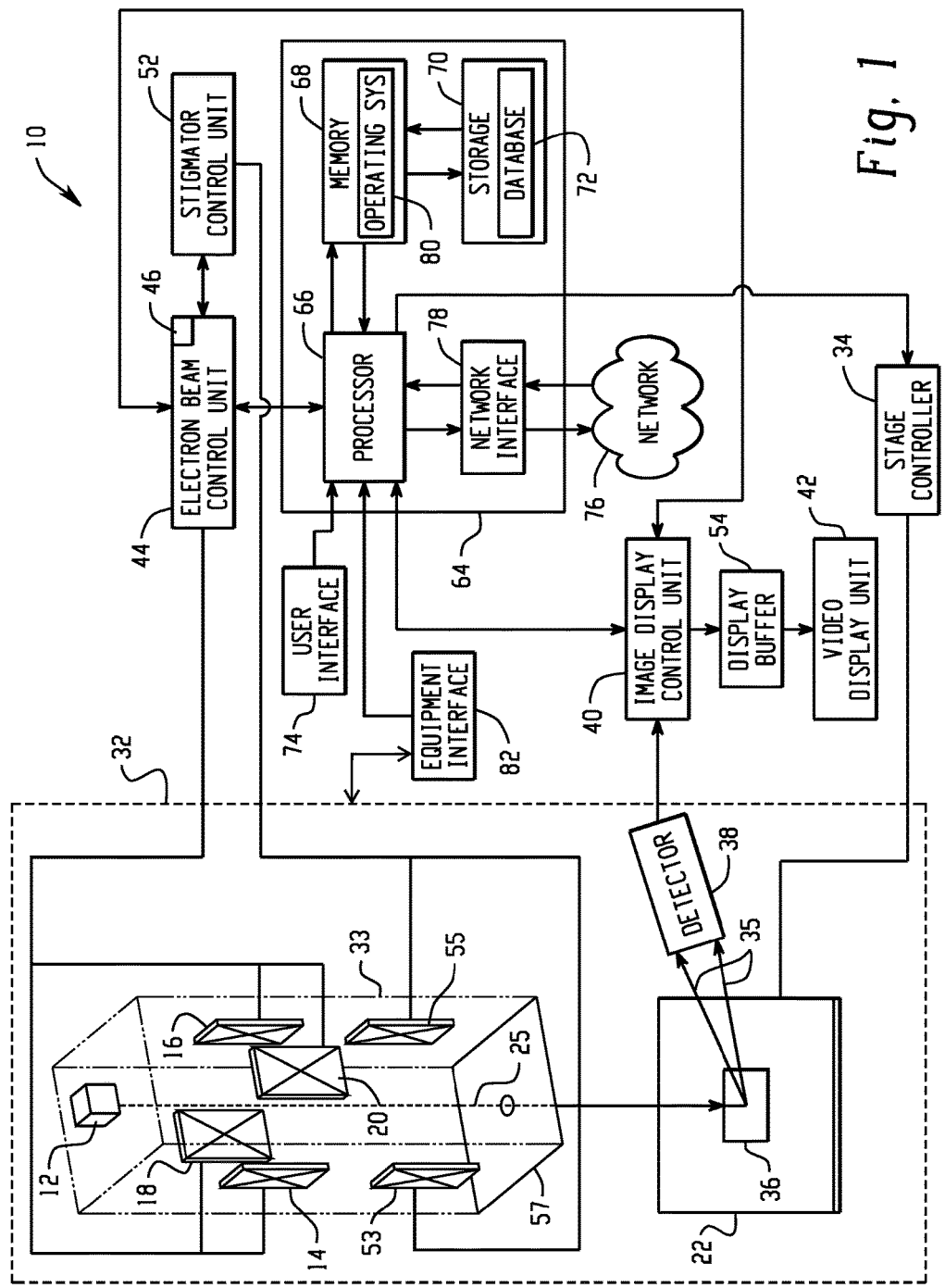
FIG. 1 is a diagrammatic view of a CDSEM in accordance with an embodiment of the invention.

With reference to FIG. 1 and in accordance with an embodiment of the invention, a critical-dimension scanning electron microscope (CDSEM) 10 includes an electron gun 12, electromagnetic coils 14, 16, 18, 20, and a stage 22 that are housed inside a vacuum chamber 32. The electron gun 12 includes an anode and cathode (not shown) to which an accelerating voltage is applied to create a relatively large potential difference that extracts an emission current from the cathode and, thereby, generate a primary electron beam 25 by field emission or thermionic emission. Located inside the vacuum chamber 32 of the CDSEM 10 is a column 33 that features various condenser lenses, objective lenses, and apertures, which are used as electron optics to focus and collimate the primary electron beam 25 in the travel path from the electron gun 12 to the stage 22. The stage 22 is movable under the management of a stage controller 34 to situate different features of interest or targets on a wafer 36 within the field of view of the primary electron beam 25.

The electromagnetic coils 14, 16, 18, 20 are disposed within the column 33 between the electron gun 12 and the stage 22. The electromagnetic coils 14, 16, 18, 20 are configured to scan the primary electron beam 25 across an area that includes each target on the surface of the wafer 36. The travel path of the primary electron beam 25 passes through the electromagnetic coils 14, 16, 18, 20 in the column 33 of the CDSEM 10. The electromagnetic coils 14, 16, 18, 20 cooperate to deflect the primary electron beam 25 so that the primary electron beam 25 scans a feature in a surface area on the wafer 36. An electron beam control unit 44 is configured to monitor and control deflection of the primary electron beam 25 by the electromagnetic coils 14, 16, 18, 20 with applied voltages. A stigmator control unit 52 is configured to monitor and control the shape of the primary electron beam 25 using the electromagnetic coils 53, 55 with applied voltages, and may be used to control the beam astigmatism.

When irradiated by the primary electron beam 25, the wafer 36 emits electrons 35 that are collected by a detector 38. For example, the electrons 35 may originate from interactions of the primary electron beam 25 with atoms at, or near, the surface of the wafer 36 that generate electrons 35, and the detector 38 may include a phosphor or scintillator that converts the collected electrons 35 into flashes of light and a photomultiplier that converts these flashes of light into amplified electrical signals. The detector 38 may be positively biased to attract the electrons 35 that are collected.

The amplified electrical signals output from the detector 38 are converted by an image display control unit 40 to video signals, which are supplied to a display buffer 54 and a video display unit 42 for display as an image of a region of interest inside a measurement box on the wafer 36. The image display control unit 40 of the CDSEM 10 manages the operation of the video display unit 42. The images from the wafer 36 contain a two-dimensional intensity distribution or map of the electron emission prompted by the interaction of the primary electron beam 25 with the surface of the wafer 36. Alternatively, the images from the wafer 36 may be digitized into discrete pixels before display on the video display unit 42 and saved in a digital format. The brightness of the individual pixels in the image displayed on the video display unit 42 depends on the number of electrons 35 from the corresponding location on the wafer 36 that reach the detector 38.

A computer 64 may be used to, among other functions, coordinate and control the operation of the CDSEM 10, as well as to provide fault detection and classification analysis. The computer 64 includes a processor 66, which is coupled at least to stage controller 34, image display control unit 40, electron beam control unit 44, and equipment interface 82, a memory 68 coupled with the processor 66, and a Human Machine Interface (HMI) 74. Processor 66 may include one or more devices selected from microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 68. The memory 68 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. A mass storage memory device 70 may include data storage devices such as a hard drive, optical drive, tape drive, non-volatile solid state drive, or any other device capable of storing information.

The computer 64 may be configured for communication on a network 76 through a network interface 78 with external resources. External resources may include, but are not limited to, servers, databases, mass storage devices, peripheral devices, cloud-based network services, or any other suitable computer resource that may be used by the computer 64, and may include other production tools in a semiconductor fabrication plant housing the CDSEM 10.

The HMI 74 may be operatively coupled to the processor 66 of the computer 64 in a known manner to allow a user to interact directly with the computer 64. The HMI 74 may include video or alphanumeric displays, a touch screen, a speaker, and any other suitable audio and visual indicators capable of providing data to the user. The HMI 74 may also include input devices and controls such as an alphanumeric keyboard, a pointing device, keypads, pushbuttons, control knobs, microphones, etc., capable of accepting commands or input from the user and transmitting the entered input to the processor 66. A user or operator may interface with the computer 64 via a graphical user interface (GUI) on a display at the HMI 74.

The computer 64 operates under the control of an operating system 80 that resides in the memory 68. The operating system 80 may manage computer resources so that computer program code embodied as one or more computer software applications, such as an application residing in memory 68, may have instructions executed by the processor 66. In an alternative embodiment, the processor 66 may directly execute an application, in which case the operating system 80 may be omitted. One or more data structures may also reside in the memory 68, and may be used by the processor 66, operating system 80, or another application to store or manipulate data.

One or more databases 72 may reside on the mass storage memory device 70, and may be used to collect and organize data used by the computer 64. Each database 72 may include data and supporting data structures that store and organize the data. In particular, each database 72 may be arranged with any database organization or structure including, but not limited to, a relational database, a hierarchical database, a network database, or combinations thereof. A database management system in the form of a computer software application executing as instructions on the processor 66 may be used to access the information or data stored in records of each database 72 in response to a query, where a query may be dynamically determined and executed by the operating system 80, other applications, or one or more modules. The databases 72 may store, for example, data in the form of recipes for use in controlling the operation of the CDSEM 10, and data generated during operation of the CDSEM 10 that relates to the operation of the CDSEM 10. The latter data may be either raw data or raw data that has been transformed into time-sequenced data.

In use, the CDSEM 10 may be used to acquire images that are used to measure and provide dimensional information, such as a line width or a hole diameter, relating to a feature on an object of interest in a field of view on the wafer 36. The feature dimensions may be used to monitor the accuracy of the manufacturing process. The dimensional measurements may be performed, for example, after photolithographic patterning and subsequent etch processing, e.g., on the patterned resist layer prior to etching the substrate and also on the etched layer.

Wafers 36 may be transferred to the stage 22 from a wafer cassette (or a Pod/FOUP). The condition and procedures of various dimensional measurements are input into a recipe in advance. A recipe is a program that represents a collection of procedures, measurement methods, runtime parameters, and input data, that is input into the CDSEM 10 and that instructs the CDSEM 10 to acquire images and measurements at different sites on a series of wafers 36. When the measurement process is started, the CDSEM 10 will automatically take each wafer 36 out of the cassette and load it into the CDSEM 10. The wafer 36 is aligned and the wafer coordinate system is matched to the tool coordinate system of the CDSEM 10. The stage 22 is maneuvered under the control of computer 64 to navigate the wafer 36 to locate the area (i.e., physical location) containing the feature of interest. The operational parameters of the CDSEM 10 are adjusted to place the area into focus for imaging of the desired features on each wafer 36 according to the recipe and image grabbing. After all features are measured according to the recipe, the CDSEM 10 returns the wafer 36 to the cassette, and the process is repeated with the next wafer 36.

A plurality of targets are identified on each wafer 36 to be the subject of imaging and one or more measurements are extracted from the images grabbed by the CDSEM 10. The measurements may include, but are not limited to, an extraction of a critical dimension at the top of a shape, an extraction of a critical dimension at the bottom of a shape, a slope equal to the different between the critical dimensions at the top and bottom of a shape, the angle of the sidewall of the shape, a line width roughness equal to a deviation of the contour of the shape of an edge relative to the ideal width, a diameter of a hole or pillar, etc.

The CDSEM 10 collects data in the form of runtime parameters during the operation of the metrology tool to grab images and make measurements according to the predetermined recipe. The runtime parameters reflect the tool health of the CDSEM 10 and/or the recipe quality. For each wafer, target, and measurement, a data package of the values of these run-time parameters is generated as data. Each data package may include runtime parameters such as a Main PR % that describes the correlation score between the found feature and a learned model for feature addressing, a PR Vector that describes the offset between the found location of a feature in field of view and an expected location for that feature in the field of view, an MM Score that describes a correlation score between the found feature and a learned model within a measurement box, an MM Offset that describes the offset between the found location of a relevant measurement structure within the measurement box and its expected location within the measurement box, a Fit Quality that describes how many of the found topographical points are used to formulate the final CD result, Vacc Offset that describes how much energy had to be add to the primary beam acceleration energy to bring the image into an optimized focus, AF Grade X/Y that describes how well the signal is behaved during an autofocus sequence (e.g., a measure for trustability), AF Result X/Y describes where the best autofocus found and that may indicate that the primary electron beam 25 is astigmated, etc.

Computer 64 is linked by the equipment interface 82 in communication with the CDSEM 10. The software and/or hardware providing the equipment interface 82 may be associated with the CDSEM 10 and/or the computer 64. The equipment interface 82 is configured to receive raw data of the runtime parameters generated by the CDSEM 10 in the form of a host report 200. The data generated by the CDSEM 10 is organized in the host report 200, in general, as shown in FIG. 2, and is transferred in a single data block. The transfer of the data may occur with a fixed duty cycle. For a given recipe 210, the raw data is organized per wafer by fields of view 220a-220n (e.g., Field 1-Field N) at a highest level in a vertical data hierarchy. This highest level reflects the successive introduction of wafers into the CDSEM 10 for measurements made on all features as designated by the recipe. For each wafer, features represented by targets 230a-230n (e.g., Target 1-Target N) are subjected to measurements 240a-240n (e.g., Measurement 1-Measurement N). The features represent the next lowest level in the vertical data hierarchy below the level of the wafer. The measurements 240a-240n represent the next lowest level in the vertical data hierarchy below the level of the features. For each of the features, the parameters are arranged in data packages 250a-250n that include run-time parameters that result from the different measurements relating to the features.

The equipment interface 82, which may be represented by an algorithm executing on the computer 64 and hardware porting the data from the CDSEM 10, transforms (i.e., converts) the run-time data in the host report 200 into a report 300 having a different format (i.e., a time-sequenced format) that is more amenable to fault detection and classification. In particular, the data in the host report is reorganized as shown in FIG. 3. In particular, for a given recipe 210, the data is re-organized according to the features represented by the targets 230a-230n (e.g., Target 1-Target N) at a highest level in a vertical data hierarchy. For each target, the measurements 240a-240n (e.g., Measurement 1-Measurement N) represent the next lowest level in the vertical data hierarchy below the level of the targets 230a-230n. For each of the measurements 240a-240n, the field 220a-220n (e.g., Field 1-Field N) represents the next lowest level in the vertical data hierarchy. For a particular set of measurements 240a-240n of one of the targets 230a-230n on a succession of fields 220a-220n, an element 250a-1-250n-1 contained in the respective data packages 250a-250n of runtime parameters has a connection.

The raw run-time data generated at the CDSEM 10 is arranged, at the time of porting to the equipment interface 82, according to measurements taken for all targets on a sequence of wafers according to a given recipe. The equipment interface 82 arranges the transformed data in a time sequence of each measurement for the same target on the sequence of wafers. The time between successive measurements is related to transfer of successive wafers to and from the stage 22, and the actual performance of the measurements. The transformed data to the computer 64 may be stored in one of the databases 72 in the mass storage memory device 70. The transformed time-sequenced data will exhibit variations over time that are correlated with performance variations in the operation of the CDSEM 10.

As part of the FDC analysis, the computer 64 may build one or more virtual sensors using mathematical models to present the content of the transformed time-sequenced data. The mathematical models use the transformed time-sequenced data as a time sequence of historical information to calculate the estimated property or condition. Empirical techniques may be used that base the calculations of the estimate on available historical measurement data of the same quantity, and on its correlation with other available measurements and parameters. Function approximation and regression techniques can be implemented using a variety of multivariate statistical modeling methods or machine-learning modeling methods including, but not limited to, least squares modeling, principal component regression, or neural network modeling. For example, a statistical analysis may be performed to determine a mean, standard deviation, and/or median for a runtime parameter, and a rule-based logic system may perform a setpoint subtraction to detect an anomaly or abnormality in the operation of the CDSEM 10. A process engineer may be notified and/or an inhibit tool may be engaged in response to the detection of anomaly or an abnormality in the operation of the CDSEM 10.

The computer 64 may perform fault detection and classification (FDC) analysis on the transformed time-sequenced data to establish a baseline of tool operation and/or to compare the current operation with the baseline, detect faults, anomalies or abnormalities, and classify or identify an observed operating parameter that is abnormal. The techniques used for FDC analysis include the use of principle component analysis (PCA), and partial least squares (PLS). Each of these techniques provides a numerical comparison of the current operation to a baseline. Limits can then be placed around the normal value or values of this comparison, and alarms can be generated whenever the comparison exceeds a threshold given by one or more of the numerical limits. When an alarm is generated, the process can be stopped or another action can be taken.

As an example, fault analysis on the output of a virtual sensor may indicate that the profile of the electron beam is non-circular in cross-section at the wafer such that the images are distorted due to astigmatism. If the astigmatism is determined to exceed a given threshold, the electromagnetic coils 14, 16, 18, 20 of the CDSEM 10 can be adjusted to apply a correction action to the beam profile that reduces the astigmatism.

As another example, fault analysis on the output of a virtual sensor may indicate that the stage 22 of the CDSEM 10 is oscillating about its ideal position either randomly or in a deterministic manner. If the stage jitter is determined to exceed a given threshold, maintenance may be scheduled as a preventative action to service the stage 22 and address the excessive stage jitter.

As another example, fault analysis on the output of a virtual sensor may indicate that a measurement box for a feature as defined in the recipe has shifted. The recipe may be corrected as a corrective action to account for the measurement box shift.

The output from the FDC analysis may decrease production scrap due to tool faults at the CDSEM 10, decrease downtime of the CDSEM 10 by improving diagnostic capability, and decrease the amount of unscheduled maintenance of the CDSEM 10 by monitoring the tool condition and scheduling preventative maintenance.

With reference to FIG. 4, a method 100 is described for monitoring tool health and recipe quality on the CDSEM 10. In block 110, run-time data from the CDSEM 10 is received at the computer 64. The run-time data is contained in the data packages that is ported from the CDSEM 10 to the equipment interface 82 executing on the computer 64. In block 120, the computer 64 converts the run-time data to time-sequenced data. In block 130, the computer analyzes the time-sequenced data to detect an abnormality in the operation of the CDSEM 10 occurring either because an issue with the tool health or an issue with the recipe used to operate the CDSEM 10. The analysis may rely on virtual sensors that are built using mathematical models to present the content of the time-sequenced data and may rely on empirical techniques and/or function approximation and regression techniques.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

A feature may be "connected" or "coupled" to or with another element may be directly connected or coupled to the other element or, instead, one or more intervening elements may be present. A feature may be "directly connected" or "directly coupled" to another element if intervening elements are absent. A feature may be "indirectly connected" or "indirectly coupled" to another element if at least one intervening element is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   acquiring run-time data for a plurality of features on a plurality of wafers at a critical dimension scanning electron microscope during the operation of critical dimension scanning electron microscope;
   generating, from the run-time data at an equipment interface coupling the critical dimension scanning electron microscope with a computer, a plurality of data packages including a plurality of measurements of the features organized per wafer by fields of view;
   receiving, at the computer, the data packages via the equipment interface;
   converting, by the computer, the run-time data in the data packages to time-sequenced data organized by a time sequence of the measurements for each feature according to the fields of view and an order of introduction of the wafers into the critical dimension scanning electron microscope; and
   analyzing, by the computer, the time-sequenced data to detect an operational abnormality associated with the critical dimension scanning electron microscope.

2. The method of claim 1 further comprising:
   performing, by the computer, a fault detection and classification analysis.

3. The method of claim 1 further comprising:
   building, by the computer, a virtual sensor using a mathematical model to assess a content of the time-sequenced data.

4. The method of claim 1 further comprising:
   building, by the computer, a plurality of virtual sensors using mathematical models to assess a content of the time-sequenced data.

5. The method of claim 1 further comprising:
   adjusting a control at the critical dimension scanning electron microscope to correct the operational abnormality.

6. The method of claim 1 wherein the critical dimension scanning electron microscope generates the run-time data while being operated to measure the features on the wafers according to a recipe, and further comprising:
   adjusting the recipe to correct the operational abnormality of the critical dimension scanning electron microscope.

7. A system comprising:
   a critical dimension scanning electron microscope configured to acquire run-time data for a plurality of features on a plurality of wafers during the operation of critical dimension scanning electron microscope;
   an equipment interface coupled with the critical dimension scanning electron microscope, the equipment interface configured to generate, from the run-time data, a plurality of data packages including a plurality of measurements of the features organized per wafer by fields of view;
   one or more computer processors linked by the equipment interface in communication with the critical dimension scanning electron microscope; and
   a memory storing instructions that, upon execution by the one or more computer processors, cause the system to:
   receive the data packages via the equipment interface;
   convert the run-time data in the data packages to time-sequenced data the run-time data in the data packages to time-sequenced data organized by a time sequence of the measurements for each feature according to the fields of view and an order of introduction of the wafers into the critical dimension scanning electron microscope; and
   analyze the time-sequenced data to detect an operational abnormality associated with the critical dimension scanning electron microscope.

8. The system of claim 7 further comprising instructions that upon execution by the one or more computer processors cause the system to:
   perform a fault detection and classification analysis.

9. The system of claim 7 further comprising instructions that upon execution by the one or more computer processors cause the system to:
   build a virtual sensor using a mathematical model to assess a content of the time-sequenced data.

10. The system of claim 7 further comprising instructions that upon execution by the one or more computer processors cause the system to:
    build a plurality of virtual sensors using mathematical models to assess a content of the time-sequenced data.

11. The system of claim 7 further comprising instructions that upon execution by the one or more computer processors cause the system to:
    adjust a control at the critical dimension scanning electron microscope to correct the operational abnormality.

12. The system of claim 7 wherein the critical dimension scanning electron microscope generates the run-time data while being operated to measure the features on the wafers according to a recipe, and further comprising instructions that upon execution by the one or more computer processors cause the system to:
    adjust the recipe to correct the operational abnormality of the critical dimension scanning electron microscope.

* * * * *